March 26, 1929.  C. HAUSTEIN  1,706,667
EYESHIELD
Filed Nov. 6, 1925  2 Sheets-Sheet 1

Charles Haustein
INVENTOR
BY Victor J. Evans
ATTORNEY

WITNESS: Gerald Hennesy

March 26, 1929.   C. HAUSTEIN   1,706,667
EYESHIELD
Filed Nov. 6, 1925   2 Sheets-Sheet 2
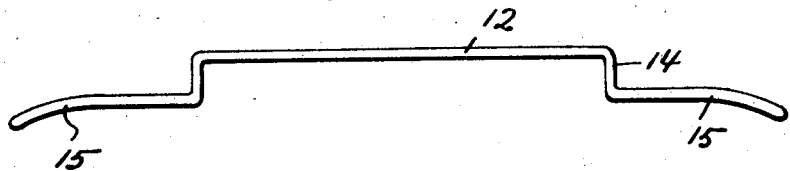
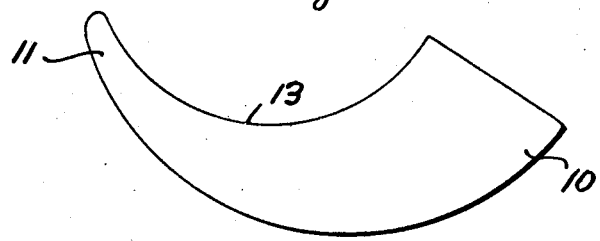
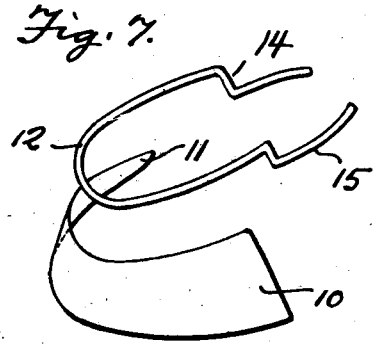
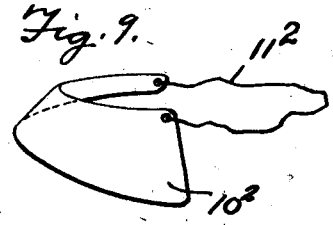
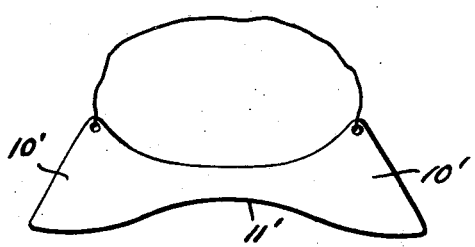
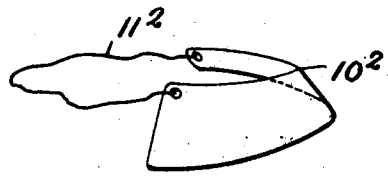
Charles Haustein
INVENTOR
BY Victor J. Evans
ATTORNEY
WITNESS: Gerald Hennesy Patented Mar. 26, 1929.

1,706,667

UNITED STATES PATENT OFFICE.

CHARLES HAUSTEIN, OF MOBILE, ALABAMA.

EYESHIELD.

Application filed November 6, 1925. Serial No. 67,411.

This invention relates to improvements in eye shields adapted for use in business and for athletic purposes, the shades being adjusted upon the forehead of the user whereby a desired shading of light may be assured as to the eye much to the comfort of the user.

An object of the invention comprehends a supporting element carried upon the forehead and extended behind the ears of the user and from which the shield is suspended.

More specifically stated the shield is adapted to shade one eye nearest a light and partially the other eye to permit a clear unobstructed vision through both eyes.

With the above and other objects in view, the invention further includes the following novel features and details of construction, to be hereinafter more fully described, illustrated in the accompanying drawings and pointed out in the appended claim.

In the drawing:—

Figure 1 illustrates one form of my invention.

Figure 2 in detail perspective thereof.

Figure 5 is an elevation of the supporting means for the shade.

Figure 6 is an elevation of the shade per se.

Figure 7 is a perspective of the shade and securing means.

Figure 8 is a diagrammatic plan view of a modified form of my invention.

Figures 9 and 10 illustrate a form of my invention using a resilient retaining means for the shades.

Figure 1:
Figure 2:
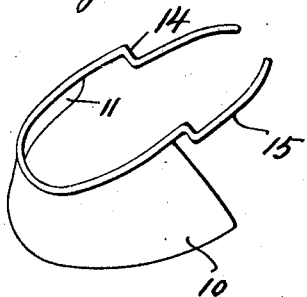

Referring to the drawings in detail, wherein like characters of reference denote corresponding parts, the reference character 10 indicates an eye shield constructed of a suitable translucent or transparent material such as celluloid having a color such as amber, blue or green included in the composition thereof for preventing glare and which shade or shield curves from one end toward the other and terminating in a reduced end portion 11 as clearly illustrated in Figure 6 of the drawings. The shades or shields 10 are constructed in the manner as illustrated in providing a greater shade upon one portion of the user's forehead to shade that particular eye exposed to the most light and at a peculiar inclination with respect thereto, whereby an even shade may be extended across the face and eyes of the user and an even vision attained.

Figure 3:
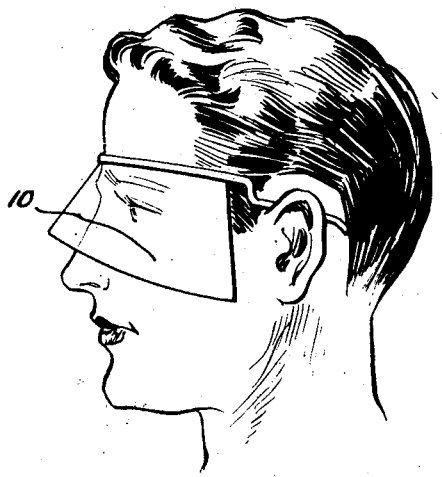
Figures 3 and 4 illustrate the respective sides of the user's head and the manner in which the eyes may be shielded as desired.
Figure 4:

In order to provide supporting means for this novel form of shield or shade 10 I provide a length of spring tensioned wire or celluloid strips 12 capable of being fitted to the upper edge 13 of the shield 10 while downwardly and rearwardly extending off set portions 14 and 15 respectively are provided upon the respective ends of the head in a similar manner to the fitting of eye glasses, as clearly illustrated in Figures 1, 3 and 4 respectively.

In Figure 8 of the drawing I have illustrated another form of my invention constituting enlarged ends 10' and an intermediate reduced portion 11' and in effect constituting a pair of reversely disposed shades or shields 10 as previously disclosed whereby the combined features of right and left shields 10 are provided in this form of my invention and consequently right and left hand shades may not be necessary as is the case in the form as previously described.

In Figures 9 and 10 of the drawings I have illustrated right and left hand shades $10^2$ each of which being constructed in accordance with the first form of my invention and having exact reverse arrangements of the first form of my invention whereby one may be substituted for the other incident to which side of the user's head light is focused while these shades or shields $10^2$ employ a resilient strip $11^2$ upon their respective ends for retaining the shades at proper inclinations upon the user's forehead.

The first form of my invention as described having the wires or celluloid strips 12 fitted to the upper edges 13 of the shades or shields 10 are substantially circular in cross section and in so doing eliminates the exposing of any cutting surface toward the user's head while the off set portions 14 raising the upper edge 13 of the shield or shade will be so arranged as to give and permit a clear vision but disposing the shade as to eliminate glare.

The invention is susceptible of various changes in its form, proportions and minor details of construction, and the right is herein reserved to make such changes as properly fall within the scope of the appended claim.

Having thus described the invention, what is claimed is:—

An eye shield comprising a translucent strip tapering from end to end in one direction, the inner and the outer edges taking the approximate configuration of a semicircle, a resilient wire carried upon the upper edge of the member and exposing a rolled surface upon the forehead of the user, and the respective ends of the wire being substantially offset and adapted for engagement with the user's head immediately above the ears in a like manner to the fitting of eye glasses whereby the shield may be positioned at an approximate height above the user's eyes.

In testimony whereof I affix my signature.

CHARLES HAUSTEIN.